US010578196B2

(12) United States Patent
Haremaki et al.

(10) Patent No.: US 10,578,196 B2
(45) Date of Patent: Mar. 3, 2020

(54) TILTING DEVICE (71) Applicant: SUGINO MACHINE LIMITED, Uozu, Toyama Prefecture (JP)

(72) Inventors: Hiroki Haremaki, Itasca, IL (US); Hajime Sakurai, Uozu (JP)

(73) Assignee: SUGINO MACHINE LIMITED, Uozu (JP)

(*) Notice: Subject to any disclaimer, the term of this patent is extended or adjusted under 35 U.S.C. 154(b) by 222 days.

(21) Appl. No.: 15/597,721

(22) Filed: May 17, 2017

(65) Prior Publication Data
US 2017/0343084 A1 Nov. 30, 2017

(30) Foreign Application Priority Data

May 25, 2016 (JP) .................................. 2016-104634

(51) Int. Cl.
*F16D 11/02* (2006.01)
*F16D 25/061* (2006.01)
(Continued)

(52) U.S. Cl.
CPC ............. *F16H 19/001* (2013.01); *B08B 3/02* (2013.01); *B08B 3/022* (2013.01); *B08B 17/025* (2013.01);
(Continued)

(58) Field of Classification Search
CPC .. F16D 11/14; F16D 2011/002; F16D 25/061; B23B 29/28; B23B 2270/28;
(Continued)

(56) References Cited

U.S. PATENT DOCUMENTS

| 2,665,674 | A | * | 1/1954 | Metsger | F02N 15/021 123/179.31 |
| 3,545,317 | A | * | 12/1970 | Shultz | B23Q 16/10 74/826 |
| 3,744,331 | A | * | 7/1973 | Caldwell | B62D 11/186 74/405 |
| 5,014,837 | A | * | 5/1991 | Kaari | F16D 25/061 192/12 B |
| 6,079,539 | A | * | 6/2000 | Fetcho | F16D 11/10 192/69.9 |
| 6,925,694 | B2 | * | 8/2005 | Sauter | B23Q 39/02 29/39 |

(Continued)

FOREIGN PATENT DOCUMENTS

| CN | 104819282 A | 8/2015 | |
| DE | 102007031324 A1 * | 1/2009 | .............. F16D 11/14 |

(Continued)

*Primary Examiner* — Jake Cook
*Assistant Examiner* — Gregory Robert Weber
(74) *Attorney, Agent, or Firm* — Oliff PLC (57) ABSTRACT

A driving device including a drive shaft and a first engaging member. The drive shaft rotates around a first axis. The first engaging member is disposed on the first axis to rotate integrally with the drive shaft. The power transmission mechanism includes a second engaging member, a propeller shaft, a piston, and a reduction gear. The second engaging member is disposed on the first axis engageable with/disengageable from the first engaging member. The propeller shaft is rotatable integrally with the second engaging member around the first axis. The piston reciprocates the second engaging member between a first position and a second position along a direction of the first axis. The reduction gear is joined to the other end side of the propeller shaft to decelerate the rotation of the propeller shaft. The reduction gear causes an output shaft joined to an object to rotate around a second axis.

9 Claims, 6 Drawing Sheets

(51) Int. Cl.
  *F16H 19/00* (2006.01)
  *B23Q 1/54* (2006.01)
  *B23Q 5/10* (2006.01)
  *B08B 3/02* (2006.01)
  *B23Q 11/00* (2006.01)
  *B08B 17/02* (2006.01)
  *B23Q 16/02* (2006.01)
  *F16D 11/14* (2006.01)
  *F16H 57/027* (2012.01)
  *F16H 57/04* (2010.01)

(52) U.S. Cl.
  CPC ............ *B23Q 1/5475* (2013.01); *B23Q 5/10* (2013.01); *B23Q 11/0075* (2013.01); *B23Q 16/022* (2013.01); *F16D 11/14* (2013.01); *F16D 25/061* (2013.01); *F16H 57/027* (2013.01); *F16H 57/043* (2013.01); *F16H 57/0495* (2013.01)

(58) Field of Classification Search
  CPC ... F16H 19/001; F16H 57/027; B23Q 1/5475; B23Q 1/5412
  USPC ........................................................ 74/89.13
  See application file for complete search history.

(56) References Cited

U.S. PATENT DOCUMENTS

| | | | | |
|---|---|---|---|---|
| 7,331,894 B2 * | 2/2008 | Sowul | ............... | F16D 25/061 192/69.91 |
| 8,894,532 B2 * | 11/2014 | Ziemer | ............... | F16D 25/061 475/269 |
| 9,393,627 B2 * | 7/2016 | Hirasaka | ............... | B08B 1/00 |
| 9,482,290 B2 * | 11/2016 | Larsen | ............... | F16D 25/082 |
| 2009/0283381 A1 * | 11/2009 | Raszkowski | ............... | F16D 25/061 192/69 |
| 2015/0219170 A1 * | 8/2015 | Brooks | ............... | B60K 17/02 475/225 |
| 2018/0222317 A1 * | 8/2018 | De Lemos | ............... | B60K 17/02 |

FOREIGN PATENT DOCUMENTS

| | | | | |
|---|---|---|---|---|
| DE | 102008040206 A1 * | 1/2010 | ............. | B60K 23/08 |
| GB | 2359596 A * | 8/2001 | ............. | F16D 11/14 |
| JP | H03-277403 A * | 12/1991 | | |
| JP | 2014-151280 A | 8/2014 | | |

* cited by examiner

TILTING DEVICE

TECHNICAL FIELD

The present invention relates to a tilting device used for a machine such as a cleaning device, a machine tool, a drying device, and an inspection device to tilt an object.

RELATED ART

A tilting device constituted of a motor for tilt (driving mechanism) and a tilting mechanism (power transmission mechanism) has been proposed as a tilting device used for a cleaning device. The motor for tilt is disposed at a supporting member (base), and an output shaft thereof is vertically movable. The tilting mechanism is disposed at an index table (turntable). This tilting mechanism includes an input shaft disposed to be freely engaged with/disengaged from the output shaft. An elevation of the output shaft engages the output shaft and the input shaft to transmit a driving power from the motor to the tilting mechanism. A descent of the output shaft separates the output shaft from the input shaft, allowing the index table to rotate (Japanese Unexamined Patent Application Publication No. 2014-151280).

SUMMARY

For example, the cleaning device described in JP-A-2014-151280 does not provide a sufficient space below the index table. Accordingly, the driving mechanism including the motor for tilt, which is mounted to the base, is preferably downsized as much as possible. However, in JP-A-2014-151280, since the output shaft of the motor for tilt has a vertically moving structure, this causes a problem of making the structure of the driving mechanism complex and large size.

Then, an object of the present invention is to provide a tilting device used for, for example, a cleaning device with a driving mechanism of simple structure, thereby ensuring downsizing.

To achieve the object, the present invention is a tilting device for tilting an object. The tilting device includes a driving mechanism and a power transmission mechanism. The driving mechanism includes a driving device including a drive shaft and a first engaging member. The drive shaft rotates around a first axis. The first engaging member is disposed on the first axis to rotate integrally with the drive shaft. The power transmission mechanism includes a second engaging member, a propeller shaft, a piston, and a reduction gear. The second engaging member is disposed on the first axis engageable with/disengageable from the first engaging member. The propeller shaft is disposed on the first axis. One end side of the propeller shaft is inserted into the second engaging member to be rotatable integrally with the second engaging member around the first axis. The piston reciprocates the second engaging member between a first position and a second position along a direction of the first axis. The reduction gear is joined to the other end side of the propeller shaft to decelerate the rotation of the propeller shaft. The reduction gear causes an output shaft joined to the object to rotate around a second axis. The propeller shaft includes a spline shaft. The second engaging member has a spline hole meshing with the spline shaft. While the second engaging member is at the first position by an operation of the piston, the first engaging member separates from the second engaging member. While the second engaging member is at the second position by the operation of the piston, the first engaging member engages the second engaging member and the spline shaft meshes with the spline hole to rotate the first engaging member, the second engaging member, and the propeller shaft integrally with the drive shaft.

Advantageous Effects of Invention

With the present invention, a tilting device used for, for example, a cleaning device can include a driving mechanism of simple structure, thereby ensuring downsizing. Problems, configurations, and effects other than the ones described above will be made apparent by the following description of embodiments.

DESCRIPTION OF EMBODIMENTS

First Embodiment

Figure 1:
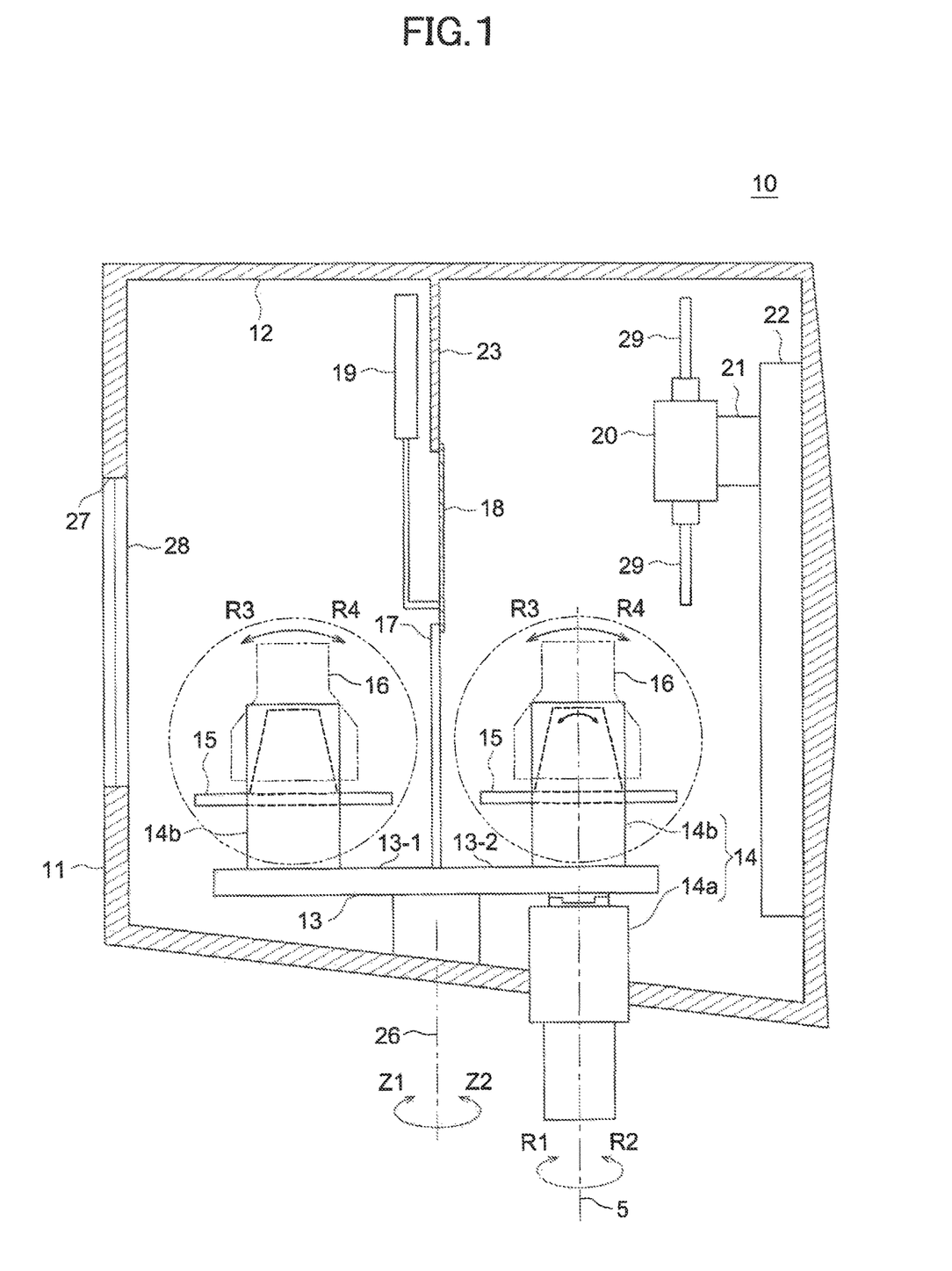
FIG. 1 is a side view illustrating an internal structure of a cleaning device that includes a tilting device according to a first embodiment of the present invention.
Figure 2:
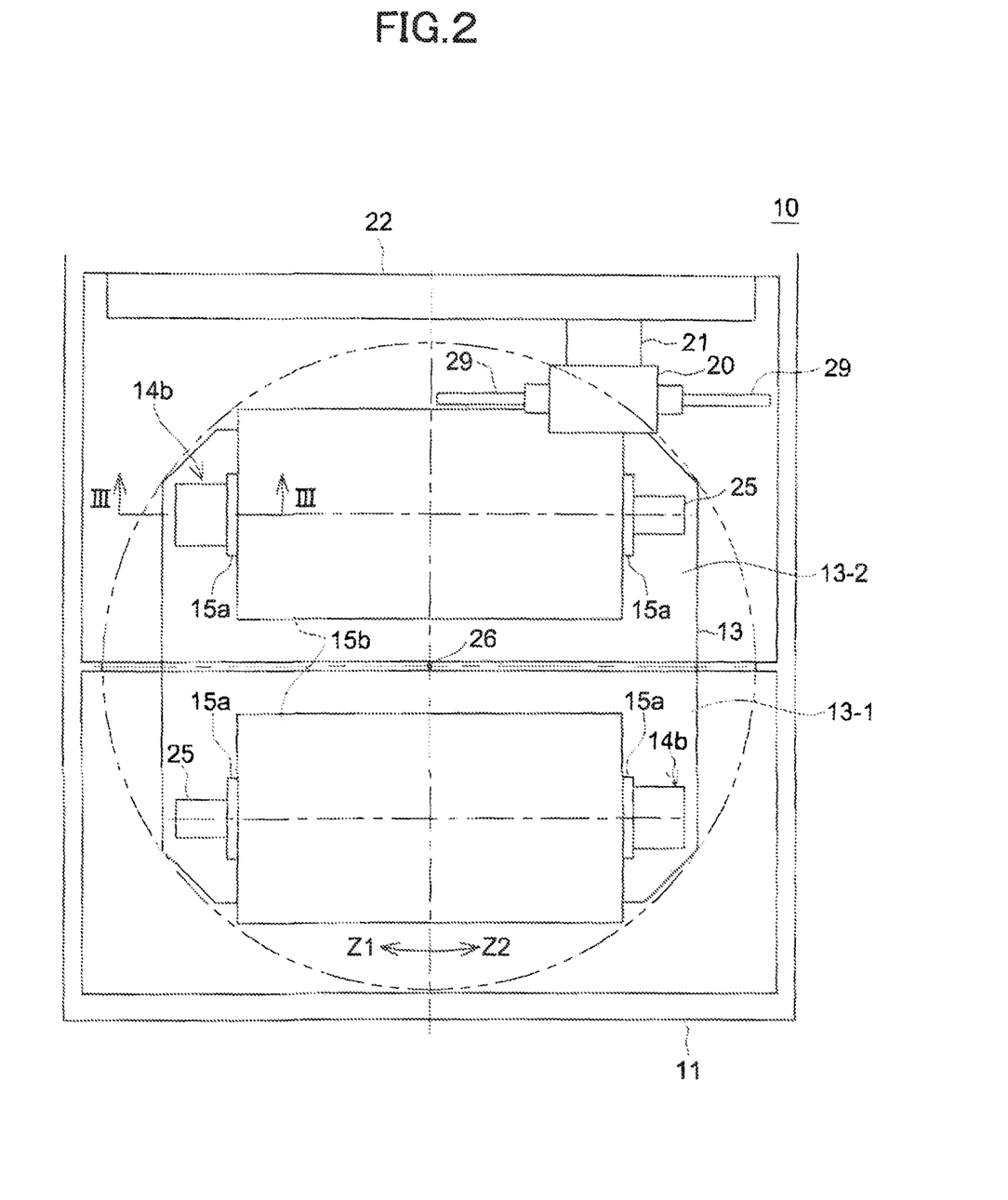
FIG. 2 is a plan view illustrating the internal structure of the cleaning device illustrated in FIG. 1.

The following gives a description with an example of applying a tilting device according to a first embodiment of the present invention to a cleaning device with reference to FIG. 1 and FIG. 2. FIG. 1 is a side view illustrating an internal structure of a cleaning device 10 that includes a tilting device 14 according to the first embodiment of the present invention. FIG. 2 is a plan view illustrating the internal structure of the cleaning device 10 illustrated in FIG. 1. The left side in FIG. 1 is the front side of the cleaning device 10 while the right side is the rear side of the cleaning device 10. The lower side in FIG. 2 is the front side of the cleaning device 10 while the upper side is the rear side of the cleaning device 10.

The cleaning device 10 shown in this embodiment is configured similar to the cleaning device described in, for example, Japanese Unexamined Patent Application Publication No. 2011-230118 and includes a box-shaped base 11 disposed at the lower side. An index table 13 as a moving body is disposed at the base 11. The index table 13 is turnable around a pivot shaft 26 in Z1 and Z2 directions in the drawings. The index table 13 is an approximately rectangular-shaped flat plate. The index table 13 is partitioned into two at the center so as to pass through the pivot shaft 26 by a partition plate 17. While the example of splitting the index table 13 into two is described, needless to say, the number of splits of the index table is freely selectable.

Power transmission mechanisms 14b of the tilting device 14 and rotation supports 25, which will be described later, are disposed on respective top surfaces of half surfaces 13-1 and 13-2 formed by partitioning the index table 13 by the partition plate 17. Placement tables 15 as tilt objects are disposed on the respective half surfaces 13-1 and 13-2 so as to be supported by the power transmission mechanisms 14b and the rotation supports 25.

The two power transmission mechanisms 14b are disposed in a point-symmetrical manner around the pivot shaft 26 on the index table 13. A driving mechanism 14a, which will be described later, of the tilting device 14 is secured to a lower side of the index table 13. As described later, the driving mechanism 14a and the power transmission mechanisms 14b constituting the tilting device 14 are configured to be joinable to and separatable from one another. When the driving mechanism 14a and the power-transmission mechanisms 14b are joined together, the placement tables 15 are tiltable in R3 and R4 directions in the drawing. Workpieces 16 as cleaned objects are secured to the placement tables 15. Driving the tilting device 14 changes the inclination of the workpieces 16 together with the placement tables 15.

The upper portion of the base 11 is covered with a splash cover 12. A separation wall 23 is disposed downward at an upper center on an inner surface of the splash cover 12 so as to be opposed to the partition plate 17. A shutter (separation wall shutter) 18 is disposed at the separation wall 23 to be vertically movable. The shutter 18 vertically moves by a cylinder 19 disposed at the separation wall 23. A movement of the shutter 18 to the lower end shuts off a clearance between the separation wall 23 and the partition plate 17. An opening 27 to carry in the workpiece 16 is disposed at the front center of the splash cover 12. A shutter (carry-in/out shutter) 28 is disposed at the opening 27.

An extension cover 22 is disposed at the rear of the splash cover 12. As the extension cover 22, a telescopic cover, a roll-up cover, a bellows, and other covers are applicable. A moving device 21 is disposed so as to pass through the extension cover 22. A turret 20 is disposed on the moving device 21. The turret 20 can move in the upper, lower, right, left, front, and rear directions by the moving device 21. The turret 20 includes at least one (two in the example in the drawing) nozzle 29. The nozzle 29 injects a cleaning fluid. With the plurality of nozzles 29, the turret 20 identifies and selects the one nozzle 29 to inject the cleaning fluid. The moving device 21 moves in accordance with a program stored in a controller. As the controller, a numerical control device is used.

After the nozzle 29 completes cleaning the rear workpiece 16, which is secured to the half surface 13-2 of the index table 13, the controller elevates the shutter 18 to separate the power transmission mechanism 14b from the driving mechanism 14a and to turn the index table 13 by 180°. Afterwards, the controller joins the driving mechanism 14a and the power transmission mechanism 14b together and opens the shutter 28. The workpiece 16 after cleaning mounted to the half surface 13-2 is removed from the shutter 28. The workpiece 16 before cleaning is put from the shutter 28 and is mounted on the half surface 13-2.

Figure 3:
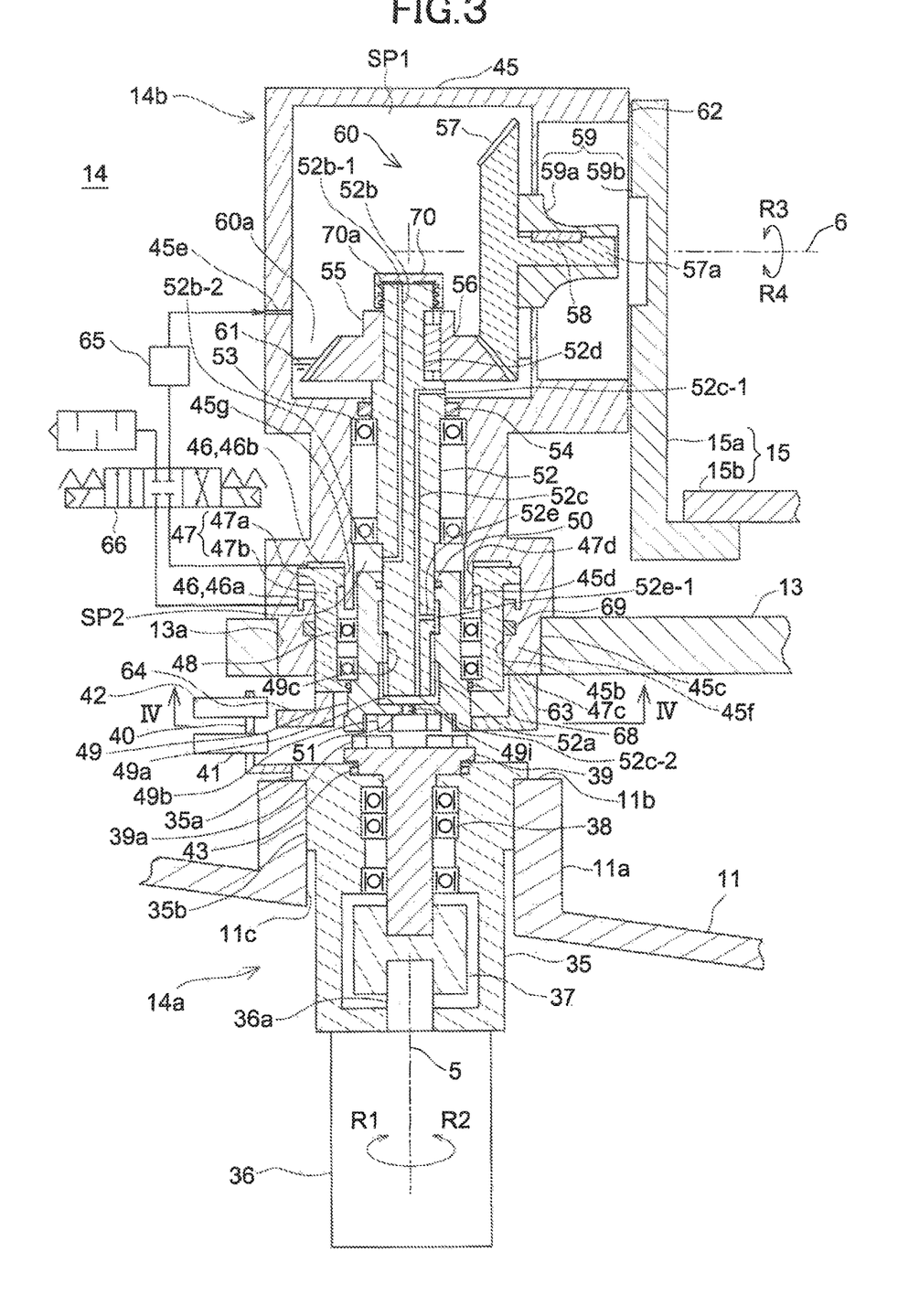
FIG. 3 is a cross-sectional view taken along a line III-III in FIG. 2.

The following describes the tilting device 14 according to the first embodiment of the present invention with reference to FIG. 3. FIG. 3 is a cross-sectional view taken along a line III-Ill in FIG. 2. The tilting device 14 includes the driving mechanism 14a and the power transmission mechanisms 14b.

The driving mechanism 14a includes a motor (driving device) 36 that includes a drive shaft 36a, a first engaging member 39, and a fixing casing 35 that houses the first engaging member 39. The drive shaft 36a and the first engaging member 39 are disposed on a first axis 5. The first engaging member 39 is engageable with/disengageable from a second engaging member 49, which will be described later. Engaging portions 39a are disposed on the upper end of the first engaging member 39.

The fixing casing 35 has an approximately hollow cylindrical shape. The first engaging member 39 is rotatably supported to the inside of the fixing casing 35 by bearings 38. Packings 43, which are seals for rotational motion, seal clearances between the first engaging member 39 and the fixing casing 35. A shaft coupling 37 joins the drive shaft 36a of the motor 36 and the first engaging member 39 together. Driving the motor 36 integrally rotates the drive shaft 36a and the first engaging member 39 around the first axis 5 in an R1 direction or an R2 direction. The fixing casing 35 houses the shaft coupling 37. The drive shaft 36a may be configured as a hollow shaft, and the first engaging member 39 may be inserted into the drive shaft 36a.

The motor 36 is mounted to the lower surface of the fixing casing 35. Here, instead of the motor 36, a cam device, a rotating cylinder, and other indexing devices are applicable. A flange body 35a is disposed on the upper end of the fixing casing 35. An outer surface 35b at the upper portion of the fixing casing 35 is a smooth cylindrical surface.

The base 11 includes a hollow cylindrical installation table 11a. A top surface 11b of the installation table 11a is a smooth planar surface. An inner surface 11c of the installation table 11a is a smoothly finished cylindrical surface. Accordingly, an insertion of the fixing casing 35 into the installation table 11a from upward causes the outer surfaces 35b of the fixing casing 35 to slidably contact the inner surfaces 11c of the installation table 11a and causes a lower surface of the flange body 35a of the fixing casing 35 to abut on the top surface 11b of the installation table 11a, thus fitting the fixing casing 35 to the installation table 11a. Thus, the fixing casing 35 is precisely attached to the base 11.

The power transmission mechanism 14b includes the second engaging member 49, a propeller shaft 52, a piston 47, a reduction gear 60, and a moving casing 45 to house these components. The second engaging member 49, the propeller shaft 52, and the piston 47 are disposed on the first axis 5. One end side of the propeller shaft 52 is inserted into the second engaging member 49, and the other end side is joined to the reduction gear 60 so as to be rotatable integrally with the second engaging member 49 around the first axis 5. Although the details are described later, the rotation of the drive shaft 36a in the R1 and the R2 directions finally tilts the placement table 15 in the R3 and R4 directions.

The moving casing 45 is formed of a hollow structure and has a support surface 45c, which is a cylindrical surface, on the lower portion. The index table 13 has a smoothly finished cylindrical fixing hole 13a. Fitting the support surface 45c to this fixing hole 13a secures the moving casing 45 to the index table 13.

A cylinder 46 is disposed at the lower portion of the moving casing 45. The cross-sectional surface of the cylinder 46 perpendicular to the first axis 5 has a rectangular doughnut shape. A first guide member 45f is disposed at a portion lower than the cylinder 46 of the moving casing 45. The first guide member 45f is continuous from the cylinder 46 and formed into a cylindrical shape. An inner peripheral surface of this first guide member 45f is a first support surface 45b. A thin-walled, cylindrical second guide member 45g is disposed at the inside of the cylinder 46. An outer peripheral surface of this second guide member 45g is a second support surface 45*d*. The first guide member 45*f* and the second guide member 45*g* are disposed on the first axis 5. An inner diameter of the first support surface 45*b* is larger than an outer diameter of the second support surface 45*d*.

The cylinder 46 internally includes the piston 47. The piston 47 is disposed on the first axis 5 and vertically reciprocates. Specifically, the piston 47 reciprocates between a first position (see FIG. 3) at which the second engaging member 49 separates from the first engaging member 39 and a second position (see FIG. 6) at which the second engaging member 49 engages the first engaging member 39.

The piston 47 has a hollow cylindrical shape internally including the second engaging member 49. The piston 47 includes a small-diameter trunk portion 47*b* and a large-diameter flange portion 47*a*. The trunk portion 47*b* abuts on the second engaging member 49 to move the second engaging member 49 along the direction of the first axis 5. The flange portion 47*a* projects outward from the upper end of the trunk portion 47*b*. The flange portion 47*a* is disposed at the inside of the cylinder 46 to partition a space of the cylinder 46 into a first chamber 46*a* on the motor 36 side (the lower side in FIG. 3) and a second chamber 46*b* on a side opposite to the motor 36 (the upper side in FIG. 3). In contrast, the trunk portion 47*b* is disposed at the inside of the first guide member 45*f*.

As long as the piston 47 can reciprocate the second engaging member 49 along the first axis 5 in this embodiment, the piston 47 can have any shape. That is, the piston 47 may have a shape other than the hollow cylindrical shape.

The outer peripheral side surface of the trunk portion 47*b* is formed into a smoothly finished cylindrical surface. This cylindrical surface is a first sliding surface 47*c* that slides with respect to the first support surface 45*b*. The inner peripheral side surface of the flange portion 47*a* is formed into a smoothly finished cylindrical surface. This cylindrical surface is a second sliding surface 47*d* that slides with respect to the second support surface 45*d*. The first sliding surface 47*c* of the trunk portion 47*b* is slidably supported to the first support surface 45*b* of the first guide member 45*f*. The second sliding surface 47*d* of the flange portion 47*a* is slidably supported to the second support surface 45*d* of the second guide member 45*g*. Therefore, the piston 47 can precisely reciprocate on the first axis 5 without a swing.

A ring groove is disposed at the first support surface 45*b*. A scraper 69 is disposed at this ring groove. The scraper 69, which is a seal for reciprocation motion, seals a clearance between the first support surface 45*b* and the first sliding surface 47*c* when the piston 47 moves along the first axis 5.

The second engaging member 49 is rotatably supported by bearings 48 at the inside of the piston 47. The bearings 48 are disposed at the inside of the trunk portion 47*b* and below the second guide member 45*g*. A seal 68 is disposed at the lower end of the piston 47. The seal 68 is a seal for rotational motion. The seal 68 seals a clearance between the second engaging member 49 and the piston 47.

The second engaging member 49 has an approximately cylindrical shape. A cylindrical closed-bottom hole 49*a* is disposed on the second engaging member 49 from upward. A plug hole 49*i* is disposed on the bottom surface of the second engaging member 49 so as to communicate with the closed-bottom hole 49*a*. A plug 51 is embedded into the plug hole 49*i* by tightening a screw.

A spline hole 49*c* is disposed at the center of the closed-bottom hole 49*a* in the direction along the first axis 5. The spline hole 49*c* meshes with a spline shaft 52*a*, which will be described later. This spline hole 49*c* has a plurality of grooves meshing with the spline shaft 52*a* at the inner peripheral surface. The inner diameter of the spline hole 49*c* has a diameter slightly smaller than the closed-bottom hole 49*a*. The second engaging member 49 includes a receiving portion 49*b* (described later) that engages the engaging portion 39*a* of the first engaging member 39 at the lower end. The second engaging member 49 preferably includes scrapers 50 that seal between the propeller shaft 52, which will be described later, and the second engaging member 49 at the upper end. This scraper 50 is also a seal for reciprocation motion similar to the scraper 69.

The reduction gear 60 is disposed at the upper portion of the moving casing 45. A cylindrical space is disposed at the center of the moving casing 45 in the height direction around the first axis 5. The propeller shaft 52 is rotatably supported at the center of this moving casing 45 by bearings 53. The propeller shaft 52 serves as an input shaft for the reduction gear 60. The spline shaft 52*a* is disposed at the lower end of the propeller shaft 52. The spline shaft 52*a* meshes with the spline hole 49*c* for sliding.

The reduction gear 60 decelerates a power input from the propeller shaft 52 and transmits the power to the placement tables 15. The reduction gear 60 is constituted of a first bevel gear 55, which is secured to the upper end of the propeller shaft 52, a second bevel gear 57, which meshes with the first bevel gear 55, and a final reducer 59 joined to the second bevel gear 57.

The first bevel gear 55 and the second bevel gear 57 are disposed at an inside of an oil tank 60*a*, which is the space disposed at the upper inside of the moving casing 45. The propeller shaft 52 passes through the oil tank 60*a*. A packing 54 is disposed between the oil tank 60*a* and the propeller shaft 52. As the packing 54, an oil seal with spring made of a rubber-based material is applicable. The oil tank 60*a* accumulates lubricating oil 61 to the extent that a teeth surface of the first bevel gear 55 is partially immersed. The oil surface of the lubricating oil 61 is set lower than an inlet 52*b*-1 of an air passage 52*b*, which will be described later, in a gravity direction. This prevents the lubricating oil 61 from flowing into the air passage 52*b*, obstructing this air passage 52*b*, and causing purge air to fail to flow through.

Preferably, a cap 70 with labyrinth seal is disposed at the inlet 52*b*-1 of the air passage 52*b*. A labyrinth seal 70*a* is disposed between the cap 70 and the distal end of the propeller shaft 52. This further effectively prevents the lubricating oil 61 from flowing into the air passage 52*b*.

The first bevel gear 55 is inserted into a small-diameter portion 52*d* at the distal end of the propeller shaft 52. Regarding the first bevel gear 55, the first bevel gear 55 is joined to the propeller shaft 52 with a key 56. Instead of the key joining, the first bevel gear 55 may be joined to the propeller shaft 52 by a frictional fastening tool.

The second bevel gear 57 includes a shaft portion 57*a*. This shaft portion 57*a* is fitted to an input shaft 59*a* of the final reducer 59 and is joined together with a key 58. Thus, the second bevel gear 57 is secured to the moving casing 45. As illustrated in in FIG. 3, the first axis 5, which is the rotational center of the first bevel gear 55, is perpendicular to a second axis 6, which is a rotational center of the second bevel gear 57. A reduction gear ratio of the first bevel gear 55 to the second bevel gear 57 is set to 1/1 to 1/5 and preferably 1/1 to 1/2.

The final reducer 59 is a reducer of small backlash or no backlash. The final reducer 59 includes an output shaft 59*b* coaxially with the input shaft 59*a*. This output shaft 59*b* is joined to the placement table (object) 15 to transmit the power to the placement table 15. That is, the rotation of the output shaft 59b tilts the placement table 15 in the R3 and R4 directions around the second axis 6.

The end surface of the final reducer 59 is positioned on an approximately identical surface to the end surface of the moving casing 45. The outer peripheral surface of the final reducer 59 is fitted to and inserted into a concave portion formed on the side portion of the moving casing 45. Therefore, the input shaft 59a and the output shaft 59b of the final reducer 59 are precisely positioned with respect to the moving casing 45. To eliminate the backlash, the second bevel gear 57 may be biased to the first bevel gear 55 from the input shaft 59a side of the final reducer 59 along the direction of the second axis 6. The reduction gear ratio of the final reducer 59 is set to 1/10 to 1/100 and is preferably set to 1/20 to 1/60. That is, the final reducer 59 significantly decelerates the rotation of the propeller shaft 52.

The placement table 15 is constituted of table receiving portions 15a disposed at both ends and a placement plate 15b suspended over the two table receiving portions 15a. The table receiving portions 15a are secured to the output shaft 59b. A packing 62 seals between the moving casing 45 and the table receiving portions 15a.

The propeller shaft 52 internally includes the air passage 52b and an oil passage 52c along the direction of the first axis 5. However, it is not necessary to provide both the air passage 52b and the oil passage 52c. It is only necessary to employ a preferable configuration according to a machine to which the tilting device 14 is applied.

The air passage 52b has an L shape. The inlet 52b-1 of the air passage 52b opens to the top end surface of the propeller shaft 52 and communicates with a first space SP1 formed upper than the oil surface of the lubricating oil 61 in the oil tank 60a. An outlet 52b-2 of the air passage 52b opens to the outer peripheral surface of the propeller shaft 52 and communicates with a second space SP2 formed between the propeller shaft 52 and the cylinder 46 of the moving casing 45. Accordingly, the first space SP1 communicates with the second space SP2 via the air passage 52b.

The oil passage 52c has an approximately inverted L shape. An inlet 52c-1 of the oil passage 52c opens to the outer peripheral surface of the propeller shaft 52 at a position between the first bevel gear 55 and the packing 54 and communicates with the oil tank 60a. The oil passage 52c includes two outlets 52e-1 and 52c-2. The second outlet 52c-2 of the oil passage 52c opens to the lower end surface of the propeller shaft 52.

As illustrated in in FIG. 3, the oil passage 52c may have a branch passage 52e in the middle. With the oil passage 52c with the branch passage 52e, the branch passage 52e is, for example, branched from a position slightly lower than the center of the oil passage 52c, specifically, from a position slightly upper than the spline shaft 52a and below the scraper 50 to the radial direction of the propeller shaft 52. The first outlet 52e-1 of the branch passage 52e can open to the outer peripheral surface of the propeller shaft 52 near and slightly upper than the spline shaft 52a.

Accordingly, the lubricating oil 61 accumulated in the oil tank 60a flows from the inlet 52c-1 to the oil passage 52c and flows out from the second outlet 52c-2 to lubricate the lower portion of the spline shaft 52a. The lubricating oil 61 that flows from the inlet 52c-1 to the oil passage 52c, flows the branch passage 52e in its course, and then flows out from the first outlet 52e-1 lubricates the upper portion of the spline shaft 52a. That is, the lubricating oils 61 sent out from the first outlet 52e-1 and the second outlet 52c-2 lubricate the surface of the spline shaft 52a.

Here, the first outlet 52e-1 can be formed as an opening passing through the spline shaft 52a. In this case as well, the first outlet 52e-1 can properly lubricate the surface of the spline shaft 52a. With the configuration of disposing the oil passage 52c at the propeller shaft 52, for example, turbine oil is used as the lubricating oil 61.

Without the oil passage 52c, it is not necessary to provide the scraper 50. In this case, grease is applied over the spline shaft 52a. Preferably, grease containing extreme pressure additive (for example, molybdenum grease) is used as this grease. In this case, as the lubricating oil 61 accumulated in the oil tank 60a, the grease may be used as well as the turbine oil.

The piston 47 is driven by compressed air. A direction switching valve 66 supplies the compressed air supplied from a compressed air source (air supply source) 65 to any one of the first chamber 46a and the second chamber 46b to exhaust the other air. When the direction switching valve 66 supplies the first chamber 46a with the compressed air, the piston 47 elevates the inside of the cylinder 46 and the second engaging member 49 separates from the first engaging member 39. When the direction switching valve 66 supplies the second chamber 46b with the compressed air, the piston 47 descends the inside of the cylinder 46 and the second engaging member 49 engages the first engaging member 39.

The compressed air source 65 and the oil tank 60a are coupled via an air supply port 45e. The purge air is supplied from the compressed air source 65 to the first space SP1. The purge air supplied to the first space SP1 in the oil tank 60a passes through the final reducer 59 and is purged from the clearance between the packing 62 and the table receiving portions 15a. The purge air supplied to the first space SP1 passes through the air passage 52b and is sent into the second space SP2. Finally, the purge air is discharged from the clearance between the second engaging member 49 and the moving casing 45 (mainly the clearance between the second engaging member 49 and the piston 47). Accordingly, the purge air serves as an air curtain to prevent the cleaning fluid, a chip, or a similar matter from entering from the clearances between the moving casing 45 and the table receiving portions 15a as the rotation parts, and between the moving casing 45 and the second engaging member 49.

Figure 4:
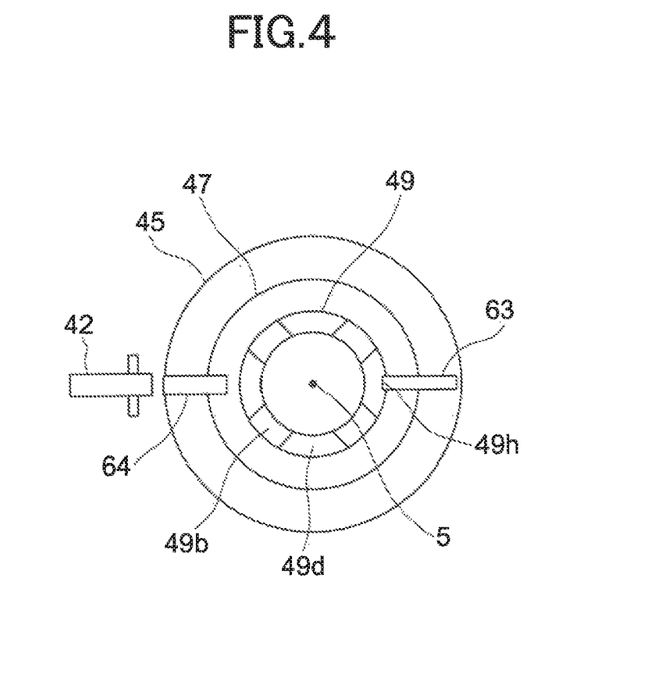
FIG. 4 is a cross-sectional view taken along a line IV-IV in FIG. 3.
Figure 5:
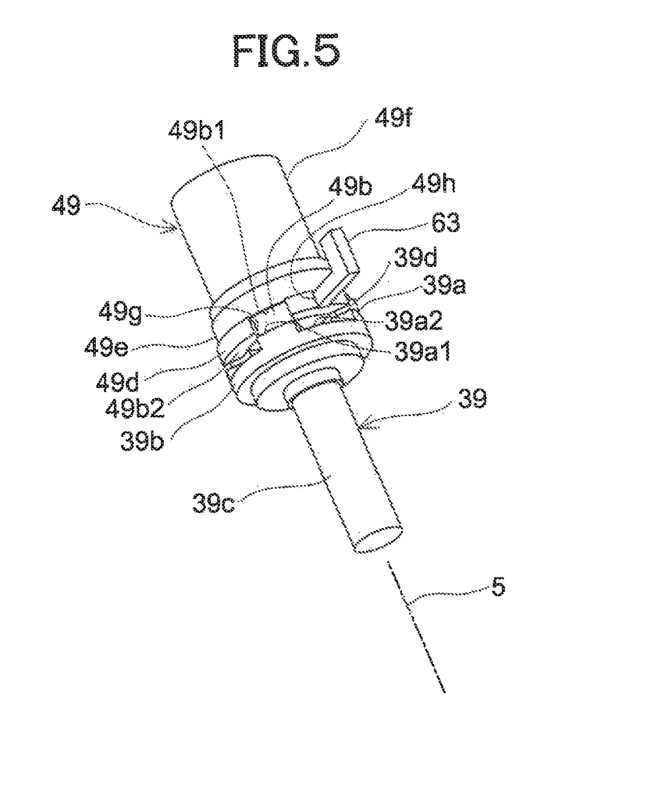
FIG. 5 is a perspective view illustrating a first engaging member and a second engaging member of the tilting device according to the first embodiment of the present invention.

The following describes details of the first engaging member 39 and the second engaging member 49 with reference to FIG. 4 and FIG. 5. FIG. 4 is a cross-sectional view taken along a line IV-IV in FIG. 3. FIG. 5 is a perspective view illustrating the first engaging member 39 and the second engaging member 49.

The first engaging member 39 includes a large-diameter, circular plate-shaped clutch portion 39b and a small-diameter shaft portion 39c on an extended line of the first axis 5, which is the rotational center of the drive shaft 36a. The first engaging member 39 has a spinning top shape. A plurality of engaging portions 39a (four pieces in the example in FIG. 5) are disposed at the distal end of the clutch portion 39b. The number of engaging portions 39a can be appropriately changed.

The engaging portions 39a extend in a cross shape in a right angle direction viewed from the direction of the first axis 5. That is, four pieces of the engaging portions 39a are disposed with intervals of 90 degrees in a circumferential direction around the first axis 5. The engaging portions 39a each includes engaging surfaces 39d parallel to one another on both sides in the circumferential direction. These engaging surfaces 39d are each parallel to the first axis 5 (to one planar surface including the first axis 5).

It is only necessary for the engaging surface 39d to have the shape corresponding to the shape of the receiving portion 49b, which will be described later, of the clutch portion 49d and therefore is not necessary to have the planar surface. However, in terms of controlling the tilt operation of the placement table 15 as the object at higher accuracy, the engaging surface 39d preferably has the planar surface. The engaging surface 39d may be formed on the planar surface identical to the one planar surface including the first axis 5. In this case, the two engaging surfaces 39d on the one engaging portion 39a radially extend from one another viewed from the first axis 5. The engaging surfaces 39d may be circumferentially inclined at a transverse cross section of the engaging portion 39a (the cross-sectional surface cut off along the surface perpendicular to the first axis 5).

The second engaging member 49 has an approximately cylindrical shape where a large-diameter clutch portion 49d, an intermediate-diameter portion 49e, and a small-diameter shaft portion 49f are coaxially continuous. The intermediate-diameter portion 49e has the diameter slightly smaller than that of the clutch portion 49d. The clutch portion 49d includes the concave receiving portions 49b. The transverse cross-sectional shape of the receiving portion 49b (the cross-sectional surface cut off along the surface perpendicular to the first axis 5) has the shape identical to the transverse cross-sectional shape of the engaging portion 39a of the first engaging member 39. A depth of the receiving portion 49b in the direction of the first axis 5 is configured to have a dimension approximately identical to the height of the engaging portion 39a. Receiving surfaces 49g on both sides of the receiving portion 49b in the circumferential direction are each disposed parallel to the one planar surface including the first axis 5. The receiving surfaces 49g are smoothly finished so as to slide with respect to the engaging surfaces 39d.

In a state where the piston 47 descends to the second position and the second engaging member 49 engages the first engaging member 39 (FIG. 6), distal end surfaces 39a1 of the engaging portions 39a do not contact bottom surfaces 49b1 of the receiving portions 49b (slightly provides clearances). Furthermore, with the piston 47 at the second position, installation surfaces 39a2 of the engaging portions 39a do not contact installation surfaces 49b2 of the receiving portions 49b. That is, in a state where the first engaging member 39 engages the second engaging member 49, the first engaging member 39 contacts the second engaging member 49 only at the engaging surfaces 39d and the receiving surfaces 49g.

In a state where the piston 47 is elevated to the first position and the second engaging member 49 separates from the first engaging member 39 (FIG. 3), the engaging portions 39a are released from the receiving portions 49b and are positioned lower than the installation surfaces 49b2. Accordingly, the index table 13 is rotatable with the piston 47 at the first position.

The clutch portion 49d has a receiving groove 49h. The receiving groove 49h is formed by partially cutting out the outer peripheral surface of the clutch portion 49d in the direction along the first axis 5. An engaging piece 63, which will be described later, slides the inside of this receiving groove 49h along the direction of the first axis 5.

With reference to FIG. 3 and FIG. 4, a bracket 40 is secured to the fixing casing 35. Sensors 41 and 42 to detect a dog 64, which will be described later, are secured to the bracket 40. The bracket 40 may be secured to the base 11.

The dog 64 is secured to the piston 47. The dog 64 has an L shape in the vertical cross section, and the lower side of the dog 64 extends radially outward. With the second engaging member 49 at a home position in the rotation direction, the sensor 41 or 42 can detect the dog 64. In the state where the piston 47 is at the second position and the second engaging member 49 engages the first engaging member 39 (FIG. 6), the sensor 41 detects the dog 64. In the state where the piston 47 is at the first position and the second engaging member 49 separates from the first engaging member 39 (FIG. 3), the sensor 42 detects the dog 64.

The engaging piece 63 is disposed at the lower surface of the moving casing 45. The engaging piece 63 has an L-shaped vertical cross section (see FIG. 3). The lower side of the engaging piece 63 is bent radially inward. The distal end of the engaging piece 63 is formed thin. Both surfaces at the distal ends of the engaging piece 63 slide to the receiving groove 49h. When the second engaging member 49 is at the home position in the rotation direction and the first engaging member 39 separates from the second engaging member 49, the engaging piece 63 fits into the receiving groove 49h (see FIG. 3). In view of this, when the first engaging member 39 separates from the second engaging member 49, that is, with the second engaging member 49 at the first position, the second engaging member 49 and the propeller shaft 52 are incapable of rotation.

Figure 6:
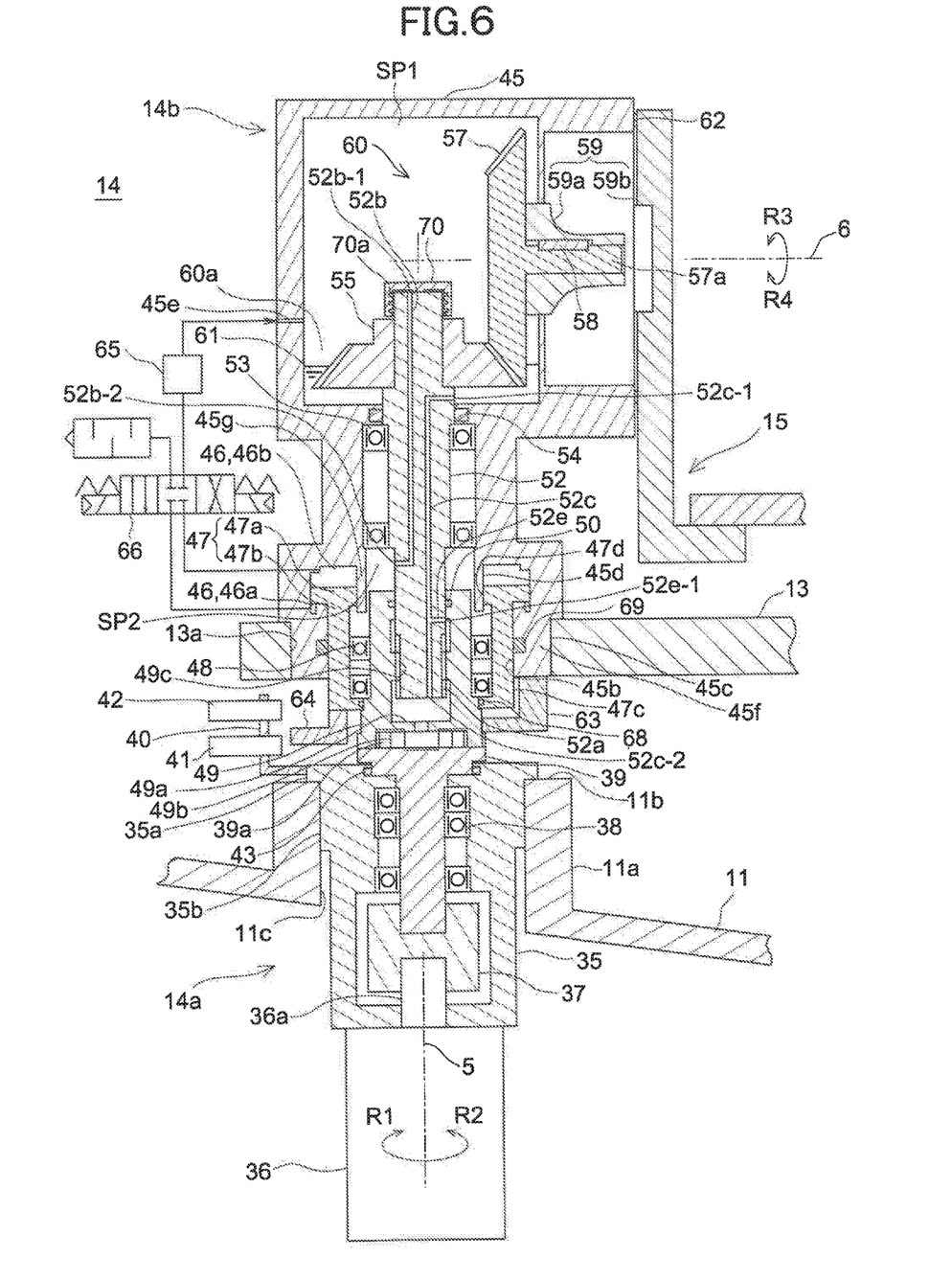
FIG. 6 is a vertical cross-sectional view illustrating an engaged state of the first engaging member with the second engaging member of the tilting device according to the first embodiment of the present invention.

In contrast, when the first engaging member 39 engages the second engaging member 49, the engaging piece 63 is released from the receiving groove 49h and is disposed at the height position of the intermediate-diameter portion 49e of the second engaging member 49 (see FIG. 6). When the first engaging member 39 engages the second engaging member 49, since the clearance is formed between the distal end of the engaging piece 63 and the intermediate-diameter portion 49e, the second engaging member 49 is freely rotatable.

In this embodiment, the reduction gear 60 has the backlash. Therefore, when the second engaging member 49 separates from the first engaging member 39, the second engaging member 49 is possibly affected by the backlash and causes a displacement of the rotation position. Therefore, employing the configuration where the receiving groove 49h is disposed at the clutch portion 49d and the engaging piece 63 fits into this receiving groove 49h, the displacement of the rotation position of the second engaging member 49 is prevented. Needless to say, this eliminates the need for disposing the receiving groove 49h at the clutch portion 49d with the use of the reduction gear 60 of no the backlash. That is, with the second engaging member 49 at the first position, the rotations of the second engaging member 49 and the propeller shaft 52 need not to be disabled.

(Operations of Cleaning Device 10)

To rotate the index table 13, the motor 36 is rotated and indexed to an original position in the state where the first engaging member 39 engages the second engaging member 49 (FIG. 6). Subsequently, the direction switching valve 66 is switched to introduce the compressed air into the first chamber 46a and to elevate the piston 47 (FIG. 3). At this time, the engaging piece 63 meshes with the receiving groove 49h. The sensor 42 detects the dog 64. The controller confirms the elevation of the piston 47. The controller opens the shutter 18 and subsequently turns the index table 13.

After the index table 13 is indexed to the fixed position, the controller closes the shutter 18. Subsequently, the controller switches the direction switching valve 66 to introduce the compressed air into the second chamber 46b and to descend the piston 47 (FIG. 6). In association with the descent of the piston 47, the engaging piece 63 is released from the receiving groove 49h. The sensor 42 stops detecting the dog 64. The engaging portions 39a engage the receiving portions 49b and the sensor 41 senses the dog 64. The rotation of the motor 36 is transmitted to the placement table 15 via the first engaging member 39, the second engaging member 49, the propeller shaft 52, the first bevel gear 55, the second bevel gear 57, and the output shaft 59b of the final reducer 59. The placement table 15 is rotated or rotated and indexed by the motor 36. Thus, the workpiece 16 on the placement table 15 changes the posture (inclination).

The moving device 21 moves the nozzles 29 according to the posture of the workpiece 16. The workpiece 16 is cleaned up with the cleaning fluid injected from the nozzle 29. When the cleaning of the workpiece 16 is completed, the motor 36 returns to the original position. When the subsequent workpiece 16 is put and the cleaning device 10 is started, the index table 13 turns again and the already-cleaned workpiece 16 is carried out to a carry-out position. The new workpiece 16 is put to the cleaning position.

(Operational Advantages)

This embodiment configures the power transmission mechanism 14b so as to vertically operate. This eliminates the need for disposing a mechanism to vertically move the first engaging member 39 constituting the driving mechanism 14a. Therefore, the configuration of the driving mechanism 14a can be simplified compared with the conventional one, thereby ensuring the downsizing. Accordingly, even if the space below the index table 13 is insufficient, this allows mounting the driving mechanism 14a to the base 11. Therefore, for example, to apply the tilting device 14 to the cleaning device 10, a freedom of design of the cleaning device 10 is enhanced.

When the piston 47 vertically reciprocates the inside of the cylinder 46, the second engaging member 49, which is rotatably supported to the inside of the piston 47, moves together with the piston 47. At this time, the second engaging member 49 vertically slides while the spline shaft 52a of the propeller shaft 52 is joined to the spline hole 49c, which is formed at the inside of the second engaging member 49, with spline. In the second engaging member 49, the spline hole 49c meshes with the spline shaft 52a regardless of the vertical position. Additionally, the piston 47 vertically slides without the swing; therefore, the propeller shaft 52 and the second engaging member 49 are coaxially held. This avoids damage in the propeller shaft 52, the spline hole 49c, the spline shaft 52a, and the second engaging member 49, ensuring the smooth operation and transmission of the power input from the drive shaft 36a to the reduction gear 60.

With the first engaging member 39 engaging the second engaging member 49, the first engaging member 39 contacts the second engaging member 49 only by the engaging surfaces 39d and receiving surfaces 49g. The engaging surfaces 39d and the receiving surfaces 49g are disposed parallel to the first axis 5. Therefore, with the first engaging member 39 engaging the second engaging member 49, a thrust of the piston 47 is not transmitted to the first engaging member 39 through the second engaging member 49. This allows preventing the index table 13 from being strained by the thrust of the piston 47.

Meshing of the first bevel gear 55 with the second bevel gear 57 can convert the rotation direction from the R1 and R2 directions to the R3 and R4 directions (in other words, the rotation axis can be converted from the vertical direction to the horizontal direction). The backlash between the first bevel gear 55 and the second bevel gear 57 and the clearances between the engaging surfaces 39d and the receiving surfaces 39g become allowances in the rotation direction.

However, in this embodiment, the final reducer 59 of no backlash or small backlash significantly decelerates the rotation of the second bevel gear 57. Therefore, the final allowance of the placement table 15 is reduced to multiples of the reduction gear ratio of the final reducer 59. That is, in this embodiment, since the reduction gear ratio of the final reducer 59 is large, this ensures decreasing the allowance in the rotation direction of the placement table 15.

The seal 68, which is the seal for rotational motion, seals between the rotating second engaging member 49 and piston 47. The scraper 69, which is the seal for reciprocation motion, seals between the reciprocating piston 47 and the first guide member 45f, which is disposed at the lower end of the moving casing 45. This reliably seals the peripheral area of the second engaging member 49, ensuring preventing the entrance of the cleaning fluid or a similar fluid and improving durability of the tilting device 14.

When the second engaging member 49 separates from the first engaging member 39, the engaging piece 63 fits into the receiving groove 49h. Accordingly, with the second engaging member 49 separated from the first engaging member 39, the rotation position of the second engaging member 49 is not displaced. Consequently, the inclination of the placement table 15 is held to the engaged state of the first engaging member 39 and the second engaging member 49. This ensures the smooth engagement when the first engaging member 39 and the second engaging member 49 are engaged again. Further, this ensures highly accurately holding the inclination of the placement table 15.

In this embodiment, the reduction gear 60 has the backlash. Therefore, separating the second engaging member 49 from the first engaging member 39 generates the allowance in the second engaging member 49 by the amount of backlash of the reduction gear 60. In the case where the reduction gear 60 has the backlash as well, the rotation of the second engaging member 49 is incapable when the second engaging member 49 separates from the first engaging member 39. This ensures smoothly engaging the second engaging member 49 with the first engaging member 39.

With the configuration where the placement table 15 is preliminary configured to take a horizontal posture when the motor 36 is at the original position and after the recovery of the motor 36 to the original position, the second engaging member 49 is controlled to be separated from the first engaging member 39, the placement table 15 can be held to take the horizontal posture in the state where the second engaging member 49 separates from the first engaging member 39. When the index table 13 rotates, the engaging piece 63 fits into the receiving groove 49h. This avoids the second engaging member 49 to rotate alone and holds the horizontal posture of the placement table 15. Since the motor 36 is indexed to the original position, when the piston 47 descends again, the engaging portions 39a are smoothly inserted into the receiving portions 49b.

Second Embodiment

Figure 7:
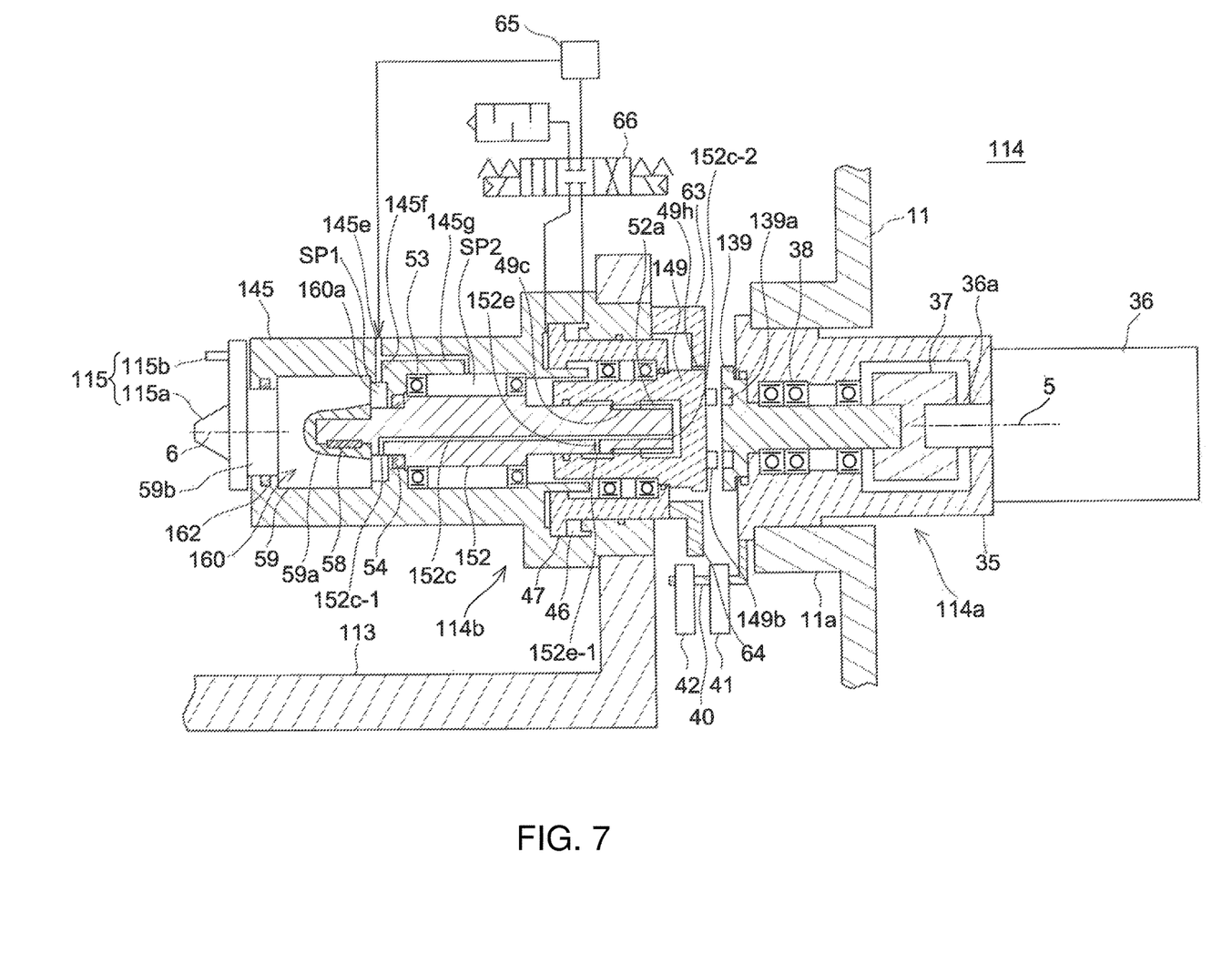
FIG. 7 is a vertical cross-sectional view of a tilting device according to a second embodiment of the present invention.

The following describes a tilting device 114 of a second embodiment with reference to FIG. 7. FIG. 7 is a vertical cross-sectional view of the tilting device according to the second embodiment of the present invention. As illustrated in in FIG. 7, in the tilting device 114 of this embodiment, the first axis 5, which is the rotational center of the drive shaft 36a, is disposed coaxially with the second axis 6, which is the rotational center of the output shaft 59b, in the horizontal direction. A reduction gear 160 does not include the bevel gear mechanism. A first engaging member 139 includes receiving portions 139a while a second engaging member 149 includes engaging portions 149b. The tilting device 114 significantly differs in the above-described three points. However, the other parts are substantially identical to those of the tilting device 14 of the first embodiment. The following describes the parts different from those of the tilting device 14 of the first embodiment in detail, but like reference numerals designate corresponding or identical elements to the first embodiment, and therefore such elements will not be further elaborated here.

A driving mechanism 114a is disposed in the horizontal direction on the base 11 of a cleaning device (not illustrated). This embodiment includes a pallet 113 as a moving body instead of the index table 13. The pallet 113 can move and index the position in a front-rear direction (a direction passing through the paper of FIG. 7) by a moving device (not illustrated). A power transmission mechanism 114b is secured to the pallet 113. The power transmission mechanism 114b is constituted of an approximately cylindrical-shaped moving casing 145, which is disposed in the horizontal direction, and an internal mechanism of the power transmission mechanism 114b.

At an end of the moving casing 145 on the driving mechanism 114a side, the cylinder 46, the piston 47, which moves the inside of the cylinder 46, and the second engaging member 149, which is rotatably supported to the piston 47, are disposed. A propeller shaft 152, which joins to the second engaging member 149 together with the spline, is rotatably supported to the center of the moving casing 145. The spline shaft 52a is disposed on one end side (the right side in the drawing) of the propeller shaft 152. An L-shaped oil passage 152c is disposed at the inside of the propeller shaft 152. The second embodiment does not provide an air passage at the inside of the propeller shaft 152.

The final reducer 59 is disposed on an end of the moving casing 145 on the side opposite to the driving mechanism 114a. The propeller shaft 152 is directly inserted into the input shaft 59a of the final reducer 59. Oil tanks 160a are disposed between the final reducer 59 and the packing 54. The oil tank 160a is a cylindrical space around the second axis 6. The oil tank 160a accumulates the lubricating oil 61. The oil passage 152c communicates between the oil tank 160a and the peripheral area of the spline shaft 52a.

A workpiece fixing device (tilt object) 115 is secured to the output shaft 59b of the final reducer 59. The workpiece fixing device 115 includes a center pin 115a and a phase index pin 115b. The center pin 115a is disposed on the second axis 6 and rotates around the second axis 6. The workpiece fixing device 115 directly supports the rotational center of the workpiece 16.

An air passage 145f through which the purge air flows and an air passage 145g branched from this air passage 145f are disposed on the upper side of the moving casing 145. The purge air supplied from an air supply port 145e passes through the final reducer 59 from the oil tank 160a and is discharged from between the output shaft 59b and packings 162. The purge air flows the air passage 145g and is finally discharged from between the second engaging member 149 and the moving casing 145 (mainly between the piston 47 and the second engaging member 149). The purge air pressurizes the inside of the moving casing 145, and the purge air flows from the clearance between the moving casing 145 and a rotating portion. This prevents the entrance of the cleaning fluid or a similar fluid to the inside of the moving casing 145.

The first engaging member 139 includes the receiving portions 139a. The receiving portion 139a is a cylindrical-shaped hollow. The second engaging member 149 includes engaging portions 149b. The engaging portion 149b has a shape identical to the receiving portion 139a. The engaging portions 149b are configured to slide with respect to the receiving portions 139a. When the piston 47 moves to the second position on the driving mechanism 114a side (the right direction in the drawing), the engaging portions 149b are inserted into the receiving portions 139a. At this time, the first engaging member 139 engages the second engaging member 149, and the first engaging member 139 and second engaging member 149 rotate integrally around the first axis 5.

When the piston 47 moves to the first position, which is the side opposite to the driving mechanism 114a (the left direction in the drawing), the engaging portions 149b are released from the receiving portions 139a and the second engaging member 149 separates from the first engaging member 139. The engaging piece 63 is fitted into the receiving groove 49h of the second engaging member 149, thus securing the rotation.

The second embodiment thus configured can simplify and downsize the configuration of the driving mechanism 114a similar to the first embodiment, ensuring a compact installation space for the driving mechanism 114a. The other operational advantages are also achieved similar to the first embodiment.

The present invention is not limited to the above-described embodiments and various modifications are possible without departing from the gist of the present invention. All the technical matters included in the technical ideas described in the claims are subjected to the present invention. While the above-described embodiments describe the preferred examples, a person skilled in the art is able to achieve various alternative examples, corrected examples, modification examples, or improved examples from the content of this disclosure, which are included in a technical range described in the claims attached.

What is claimed is:

1. A tilting device for tilting an object, comprising:
  a driving mechanism that includes:
    a driving device including a drive shaft configured to rotate around a first axis; and
    a first engaging member disposed on the first axis to rotate integrally with the drive shaft; and
  a power transmission mechanism that includes:
    a second engaging member disposed on the first axis and is engageable with or disengageable from the first engaging member;
    a propeller shaft disposed on the first axis, one end side of the propeller shaft being inserted into the second engaging member to be rotatable integrally with the second engaging member around the first axis;
    a piston that reciprocates the second engaging member between a first position and a second position along a direction of the first axis;
    a reduction gear assembly that is coupled to the propeller shaft and causes an output shaft to rotate around a second axis, the reduction gear assembly being configured to decelerate the rotation of the propeller shaft, wherein:
      the propeller shaft includes a spline shaft,
      the second engaging member has a spline hole meshing with the spline shaft,
      while the second engaging member is at the first position by an operation of the piston, the first engaging member is separated from the second engaging member, while the second engaging member is at the second position by the operation of the piston, the first engaging member engages the second engaging member and the spline shaft meshes with the spline hole to rotate the first engaging member, the second engaging member, and the propeller shaft integrally with the drive shaft, the reduction gear assembly includes an oil tank and a plurality of gears, the oil tank accumulating lubricating oil, the plurality of gears joining the other end side of the propeller shaft, which is in the oil tank, and the output shaft together, the propeller shaft internally includes an oil passage, the oil passage extending along the direction of the first axis, the oil passage having an inlet and an outlet, the inlet communicating with the oil tank, the outlet opening to the spline shaft, and the lubricating oil accumulated in the oil tank flows through the oil passage to lubricate a surface of the spline shaft;

a casing that internally houses the propeller shaft to which the second engaging member is mounted, the casing rotatably supporting the second engaging member and the propeller shaft around the first axis; and an air passage extending along the direction of the first axis, the air passage having an inlet and an outlet, the inlet communicating with a first space, the first space being formed upper than an oil surface of the lubricating oil in the oil tank, the outlet communicating with a second space, the second space being formed between the propeller shaft and the casing, wherein:

the oil tank has an air supply port to supply purge air from an air supply source, and the purge air supplied to the first space passes through the air passage and the second space and is discharged from between the second engaging member and the casing.

2. The tilting device according to claim 1, wherein:
the piston has a first sliding surface and a second sliding surface, the first sliding surface being formed in the direction along the first axis, the second sliding surface being parallel to the first sliding surface, the casing has a first support surface and a second support surface, the first support surface sliding with respect to the first sliding surface, the second support surface sliding with respect to the second sliding surface, and the first support surface guides the first sliding surface and the second support surface guides the second sliding surface to reciprocate the piston along the direction of the first axis.

3. The tilting device according to claim 2, wherein:
the piston has a hollow cylindrical shape disposed on the first axis and internally including the second engaging member, the piston including a trunk portion and a flange portion, the trunk portion abutting on the second engaging member to move the second engaging member along the direction of the first axis, the flange portion projecting outward from the trunk portion, the first sliding surface is formed on an outer peripheral side surface of the trunk portion, the second sliding surface is formed on an inner peripheral side surface of the flange portion, and the casing includes a cylindrical first guide member and a cylindrical second guide member, the first support surface being formed at the first guide member, the second support surface being formed at the second guide member.

4. The tilting device according to claim 1, wherein:
the second axis is disposed in a direction perpendicular to the first axis, and the plurality of gears include a first bevel gear and a second bevel gear, the first bevel gear meshing with the propeller shaft, the second bevel gear meshing with the first bevel gear.

5. The tilting device according to claim 1, wherein the first axis and the second axis are coaxially disposed.

6. The tilting device according to claim 2, wherein the second axis is disposed in a direction perpendicular to the first axis, and the plurality of gears include a first bevel gear and a second bevel gear, the first bevel gear meshing with the propeller shaft, the second bevel gear meshing with the first bevel gear.

7. The tilting device according to claim 3, wherein the second axis is disposed in a direction perpendicular to the first axis, and the plurality of gears include a first bevel gear and a second bevel gear, the first bevel gear meshing with the propeller shaft, the second bevel gear meshing with the first bevel gear.

8. The tilting device according to claim 2, wherein the first axis and the second axis are coaxially disposed.

9. The tilting device according to claim 3, wherein the first axis and the second axis are coaxially disposed.

* * * * *